United States Patent [19]
Cooper

[11] Patent Number: 5,202,761
[45] Date of Patent: Apr. 13, 1993

[54] AUDIO SYNCHRONIZATION APPARATUS

[76] Inventor: J. Carl Cooper, 1373 Sydney, Sunnyvale, Calif. 94087

[21] Appl. No.: 707,423

[22] Filed: May 28, 1991

Related U.S. Application Data

[63] Continuation of Ser. No. 100,740, Sep. 24, 1987, abandoned, which is a continuation of Ser. No. 675,030, Nov. 26, 1984, abandoned.

[51] Int. Cl.$^5$ .............................................. H04N 5/04
[52] U.S. Cl. ...................................................... 358/149
[58] Field of Search ............... 358/148, 149, 150, 151, 358/160, 166, 19

[56] References Cited

U.S. PATENT DOCUMENTS

| | | | |
|---|---|---|---|
| 4,313,135 | 1/1982 | Cooper | 358/149 |
| 4,618,890 | 10/1986 | Kouyama | 358/149 |
| 4,644,400 | 2/1987 | Kouyama | 358/149 |
| 4,703,355 | 10/1987 | Cooper | 358/149 |

FOREIGN PATENT DOCUMENTS

52412  4/1979  Japan .

Primary Examiner—Tommy P. Chin

[57] ABSTRACT

An audio synchronizer apparatus having a delay detector for accurately measuring the delay of a video apparatus, coupled with a controllable, variable delay audio delay circuit for accurately delaying an audio frequency signal by substantially the same amount as the video signal delay. The apparatus disclosed can operate successfully even with video delays exceeding one frame, without requiring an auxiliary correlation circuit. The variable audio delay may also contain precise filtering to compensate for adverse effects introduced by the delay.

27 Claims, 6 Drawing Sheets

AUDIO SYNCHRONIZATION APPARATUS

BACKGROUND OF THE INVENTION

The present application is a continuation of application Ser. No. 07/100,740, filed Sep. 24, 1987, now abandoned which is a continuation of application Ser. No. 06/675,030 filed Nov. 26, 1984, now abandoned.

1. Field of the Invention

The present invention relates to the field of video and audio signal processing and, in particular, to an apparatus for preserving or restoring synchronization between a television video signal and one or more of its associated audio frequency signals.

2. Description of the Prior Art

In television systems which use video processing devices such as frame synchronizers, there are often significant time delays caused in the video signals as a result of such processing. Since the video signal path is different from the audio processing path, the audio associated with a given video program and the video itself will, in general, have different processing delay times through the system. Since audio processing time is generally unaffected by the delays of the video processing, the audio signal often loses synchronization with and leads the video signal, leading to unpleasant visual/aural inconsistencies. Having the audio advanced with respect to video is just the opposite so that normally found in nature where audible sensation is delayed with respect to the visual sensation, due to the much slower propagation speed of sound though atmosphere in comparison to the propagation speed of light. In the most common occurrence of corresponding sound and visual image, that of one person speaking to another, the sound always arrives at the listener after the corresponding visual image. The further apart the listener and speaker, the more delayed is the sound arriving at the listener with respect to the corresponding image. As a result, it is natural to see a speaker's lips move slightly before one hears what is said.

After the audio to video synchronization is lost in present day television systems, just the opposite happens. Since the video is delayed by frame synchronizers and the like, and the audio is relatively undelayed, the television viewer will hear the sound of a speaker before the speaker's lips move, a phenomenon which is very unnatural. This absence of synchronization is most annoying to the television program viewer. Indeed, it has been speculated that, unless the loss of synchronization is corrected, the annoyance leads the viewer to disregard or ignore short segments of programming which contain mainly a speaker shot at close camera distances. Television commercials frequently are one such type of programming.

In the past, methods of synchronization restoration have included manual adjustments of fixed compensatory delays, by means of both of which the audio portion of the program is delayed to match the delay of the video portion. Fixed delays are acceptable when the video processing delays are fixed, but, in general, video processing delays are not fixed. Manual adjustment for compensation of delays suffers from the obvious drawback of requiring constant operator attention and being slow in its speed of compensation for changes. For these reasons, neither fixed nor manually adjustable delay compensation devices are suitable for broadcast use where the video delay may be constantly varying.

A method of adding a fixed audio delay to the audio signal is described in U.S. Pat. No. 4,218,705 filed Sep. 1, 1987, issued Aug. 19, 1980, which method contains no circuitry to automatically adjust the delay time and thus only partially corrects synchronization.

A Japanese patent application by Tokkaisho No. 54-52412 describes the problem somewhat and gives partial information of a solution. In the Tokkaisho application, the device is described as having a phase difference detector responsive to the read address and the write address to detect the phase difference thereof, a delay control circuit to convert the phase difference from to a direct current signal, and variable delay where the audio signal corresponding to the above video signal is supplied from a terminal to the variable delay circuit [35], is delayed by the d.c. signal from the delay control circuit, and is then passed to an output terminal. It is not explained how the delay circuit operates, and several questions arise as to how a d.c. signal is used for the delay, and how the delay time of the audio can be made responsive to the d.c. signal with any accuracy. Questions also arise about the operation of the phase difference detector, and the delay control circuit, which it is only said converts the output of to a d.c. signal.

A method and apparatus for preserving or restoring synchronization between a television video signal and associated audio frequency signals is described in detail in Cooper, U.S. Pat. No. 4,313,135, filed Jul. 28, 1980. The invention described works well but is somewhat costly to implement as disclosed for high quality audio. The present invention is directed to a lower cost and more precise structure which may also contain additional precision audio filtering for improved performance.

SUMMARY OF THE INVENTION

The audio synchronizer apparatus and method described herein provides a low cost delay detector for accurately measuring the delay of a video signal through a video apparatus, coupled with a controllable, variable audio delay circuit for accurately delaying an audio frequency signal by substantially the same amount as the video signal delay. The delay detector may be configured to operate with video delays of more than one frame without a correlation circuit and the variable audio delay may also contain precision filtering to compensate for adverse effects introduced by the delay.

Other objects and a fuller understanding of this invention may be had by referring to the following description and claims, taken in conjunction with the accompanying drawings.

DESCRIPTION OF THE PREFERRED EMBODIMENTS

Overview of Synchronizer Configurations

Figure 1:
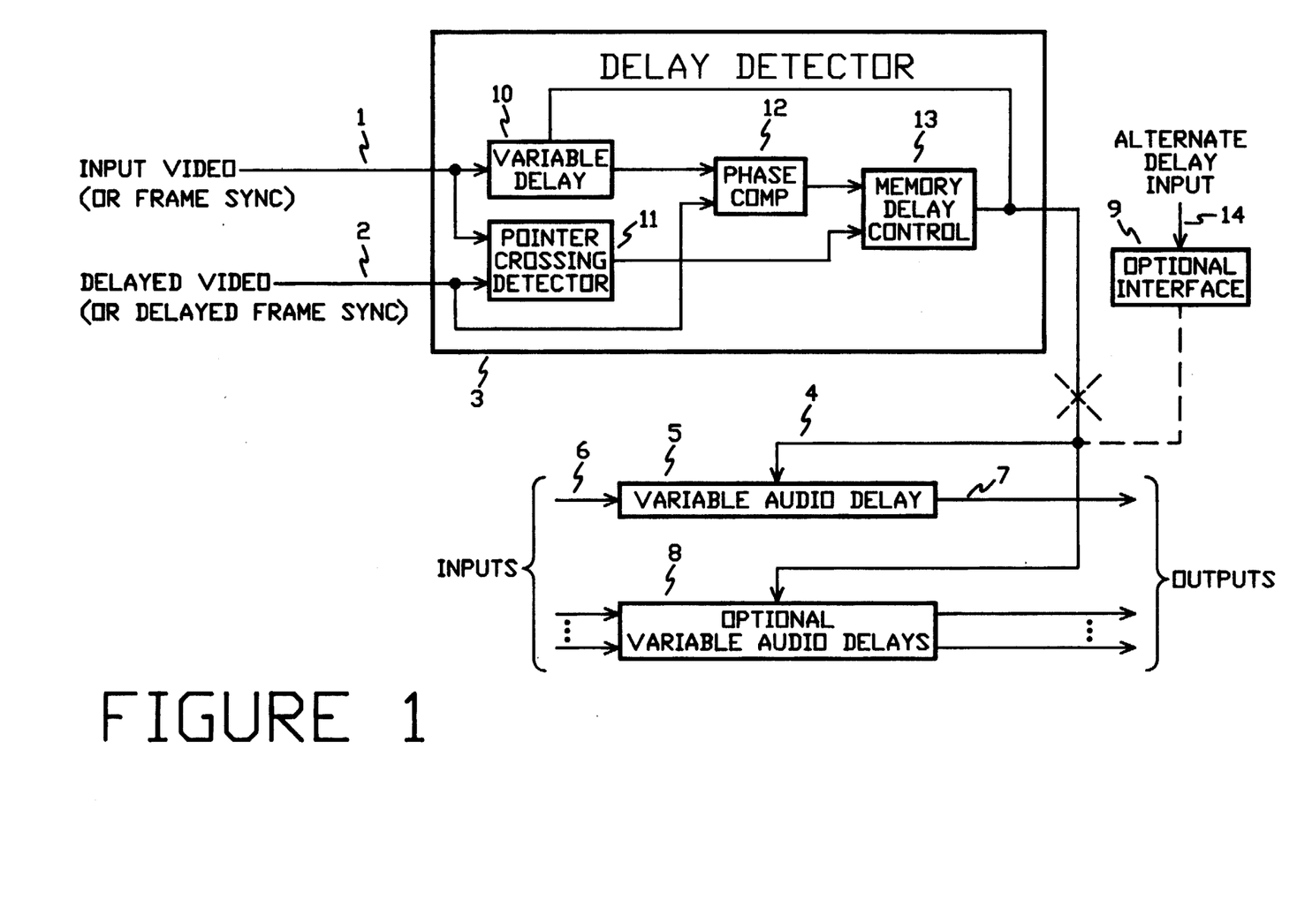
FIG. 1 is a block diagram of an audio synchronizer device in accordance with the present invention.

FIG. 1 is a block diagram of an audio synchronizer device having input signal input 1, delayed signal input 2, delay detector 3 having variable delay 10, pointer crossing detector 11, phase comparator 12 and memory delay controller 13, delay signal 4, variable audio delay 5 having audio input 6 and audio output 7, optional variable audio delay 8, optional delay interface 9, and having alternate delay input 14.

Figure 2:
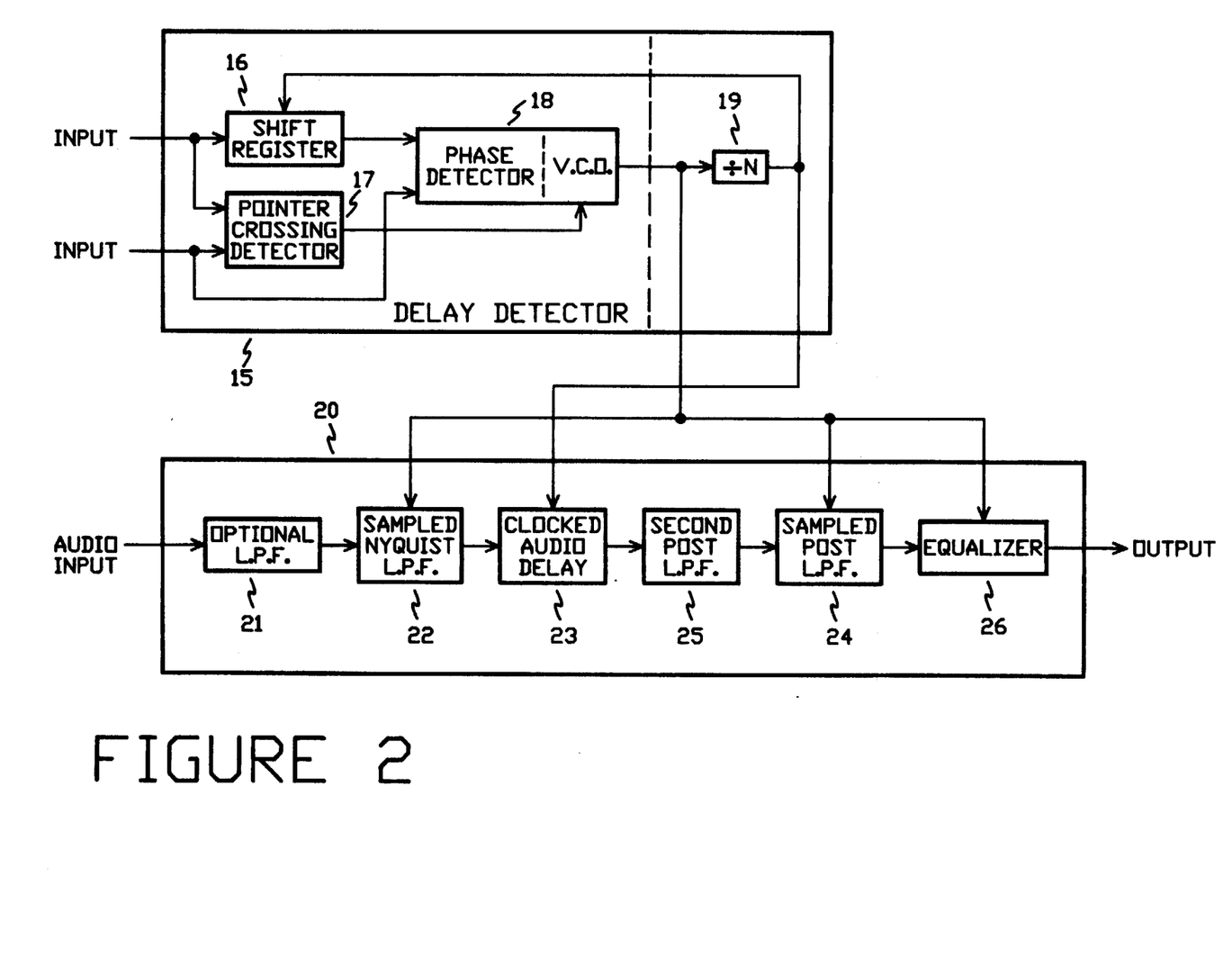
FIG. 2 is a more detailed block diagram of the audio synchronizer device of FIG. 1.

FIG. 2 is a detailed block diagram of an audio synchronizer using variable clocked delays, having delay detector 15, shift register 16, pointer crossing circuit 17, phase detector and V.C.O. 18, and digital divider 19, variable audio delay 20, optional input low-pass filter 21, sampled Nyquist low pass filter 22, clocked audio delay 23, sampled post low-pass filer 24, second post low-pass filter 25 and equilization circuit 26.

Figure 3:
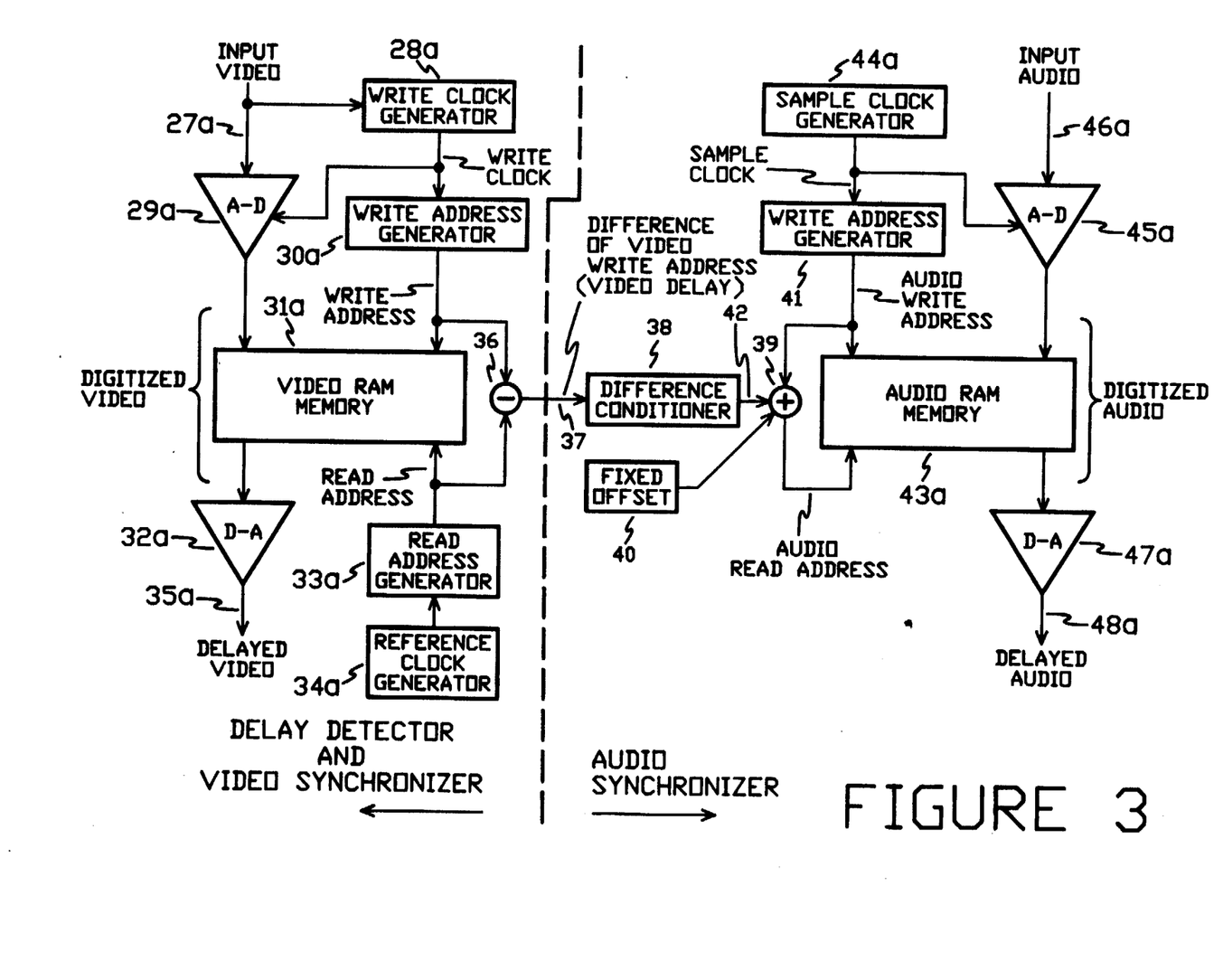
FIG. 3 is a block diagram of one embodiment of the invention coupled to a video RAM memory utilizing a RAM audio memory.

FIG. 3 is a block diagram of one embodiment of the invention which is coupled to a video synchronizer. The video synchronizer is composed of a video input terminal 27a, coupled to a write clock generator circuit 28a to provide a write clock, the write clock coupled to an A-D converter 29a and to a write address generator 30a providing a write address to video RAM memory 31a and to differencer 36, the A-D converter 29a receiving input video via 27a and providing digitized video to the video RAM memory 31a for storage, with video RAM memory 31a providing digitized video to a D-A converter 32a in response to a read address provided in response to a reference clock generator 34a by read address generator 33a, said read address also being provided to differencer 36, with the aforementioned D-A converter 32a converting its digitized video input into analog video which is coupled to output terminal 35a thereby providing delayed video. The aforementioned parts, with the exception of the differencer 36 are normally required circuits of a video frame synchronizer. FIG. 3 further includes coupling means 37 for coupling the output of 36 to difference conditioner 38 and summing means 39 which is responsive to three inputs: 1) the output of difference conditioner 38 coupled by coupling means 42; 2) a fixed offset 40, and; 3) the audio write address output from write address generator 41. The output of summing means 39 provides the audio read address which is input to audio RAM memory 43a. Sample clock generator 44a provides a sample clock to write address generator 41 and to audio A-D converter 45a which digitized input audio provided by input terminal 46a to provide digitized audio provided to the audio RAM 43a for storage. Digitized audio output from audio RAM memory 43a in response to audio read address from 39 is coupled to D-A converter 47a which converts digitized audio to analog audio providing delayed audio output from terminal 48a.

Figure 4:
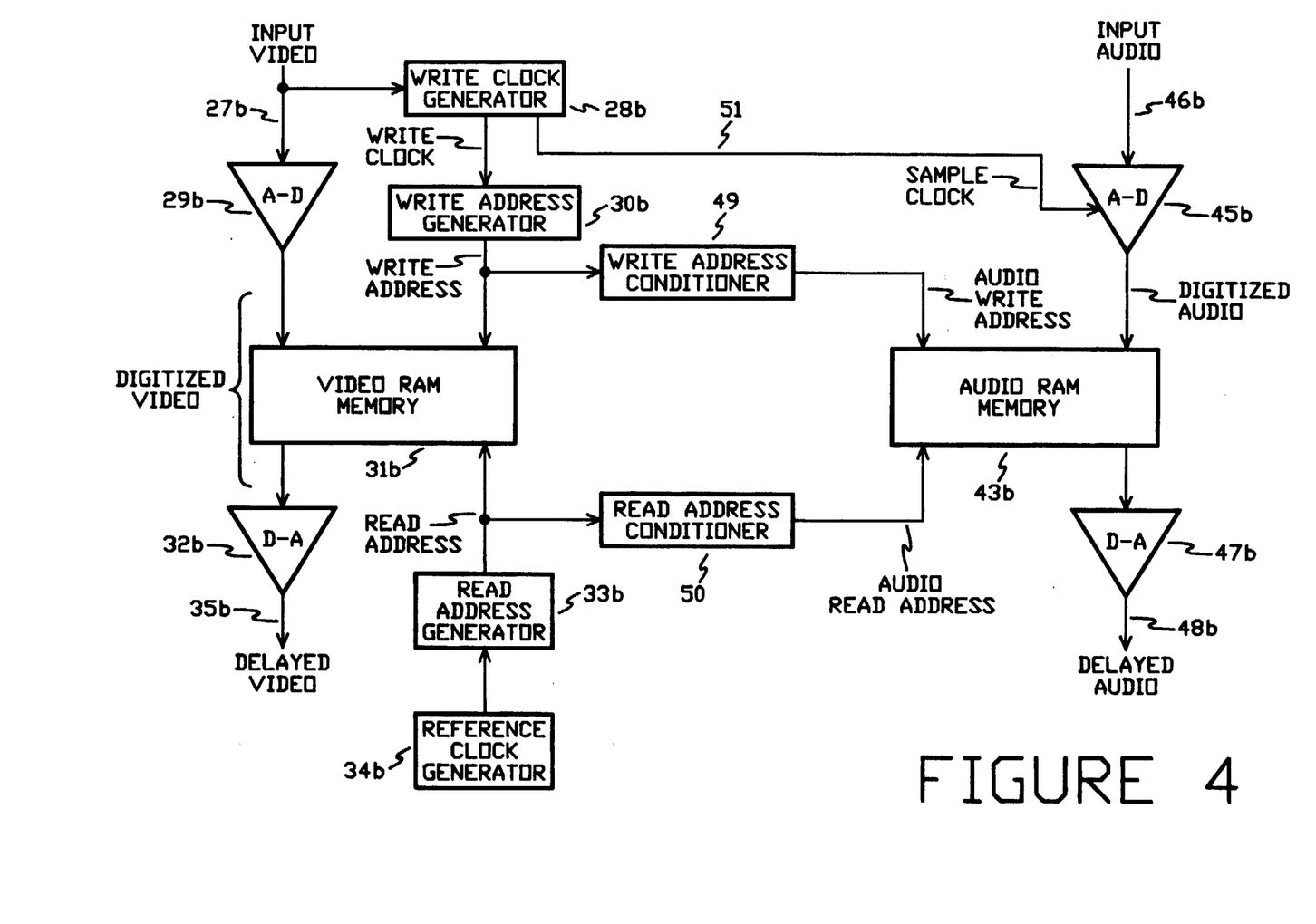
FIG. 4 is a block diagram similar to that of FIG. 3 utilizing an alternate method of addressing the audio RAM.

FIG. 4 shows components of a video frame synchronizer 27b through 35b corresponding to and functioning the same as 27a through 35a of FIG. 3, coupled to audio synchronizer components 43b and 45b through 48b corresponding to 43a and 45a through 48a of FIG. 3, and including write address conditioner 49 responsive to write address generator 30b to provide audio write address input to audio RAM 43b, and read address conditioner 50 responsive to read address generator 33b to provide audio read address to audio RAM 43b, as shown in alternate sample clock connection 51.

Figure 5:
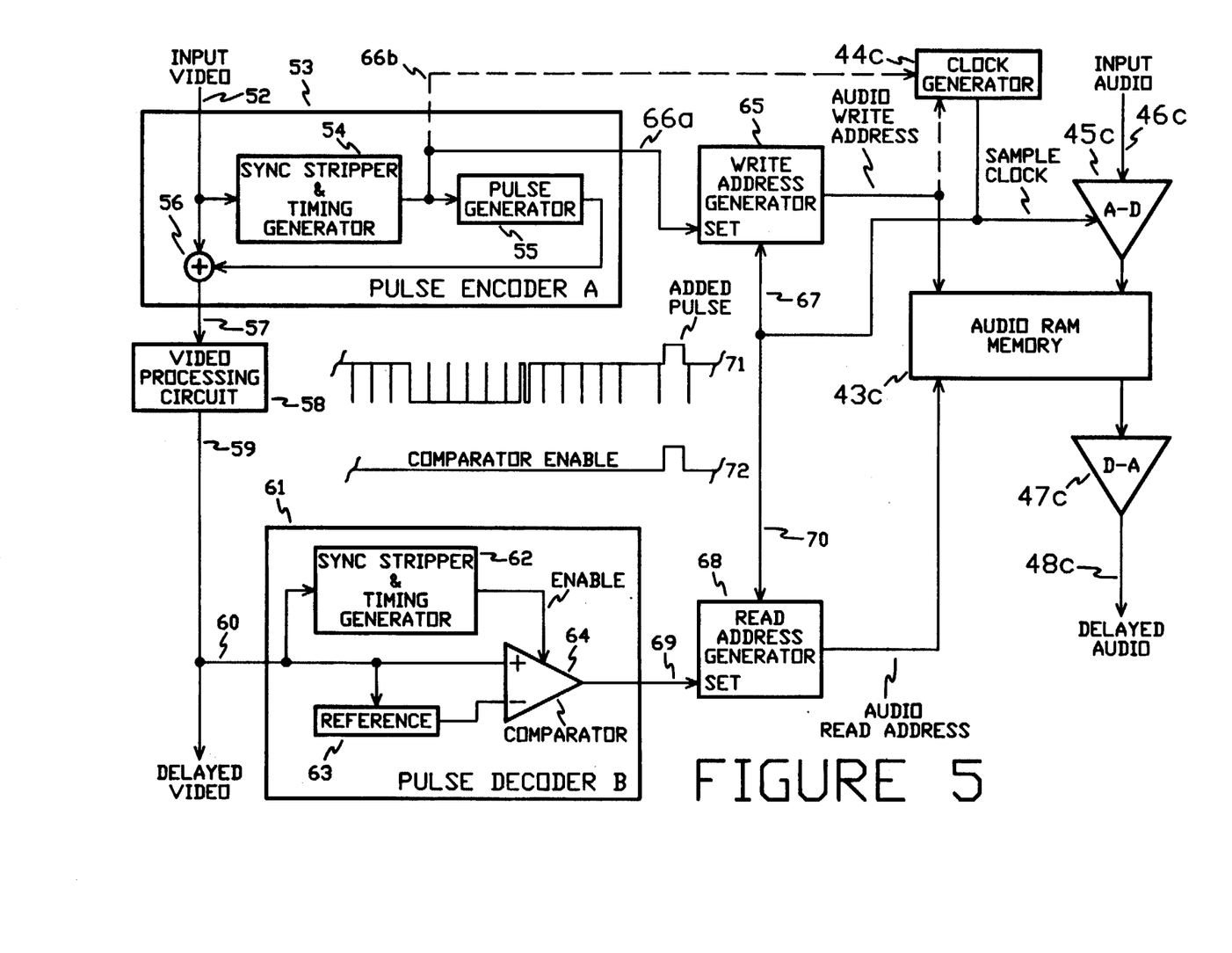
FIG. 5 is a block diagram of one embodiment of the invention which utilizes an audio timing pulse which is added to the video signal.

FIG. 5 is a block diagram of another embodiment of the invention used with a video processing circuit 58 having video input terminal 57 and delayed video output terminal 59 which video circuit is coupled to an audio synchronizing circuit having elements 43c and 48c corresponding to and functioning the same as 43a through 48a of FIG. 3 respectively, and including pulse encoder A 53 for encoding an audio timing pulse on input video applied at 52 consisting of sync stripper and timing generator 54 and providing a sync pulse to pulse generator 55 which provides an audio timing pulse to combiner 56 which combines said audio timing pulse and said input video which combination is input to video processing circuit 58 at terminal 57. Sync stripper and timing generator 54 also provides said sync pulse to the set input 66a of write address generator 65, and optional sync coupling 66b from sync stripper 54 to clock generator 44c. Delayed video output from video processing circuit 58 at 59 is passed via input terminal 60 to Pulse Decoder B 61 to Sync Stripper and Timing Generator 62 which functions the same as Sync Stripper and Timing Generator 54 and to Comparator 64. Delayed video from 60 is compared to a reference 63 by Comparator 64 when enabled by Sync Stripper and Timing Generator 62. The Comparator 64 is coupled to Read Address Generator 68 via set input 69. Waveform 71 shows a typical video vertical interval with the added sync pulse as would be seen at input 57 or at output 59 at different times, with waveform 72 showing the timing relationship between the timing signal at the set input 66a of 65 and input video at 57, or timing between the enable signal at 64 from 62 and delayed video at 60. Read Address Generator 68 and Write Address Generator 65 are also both responsive to the sample clock from Clock Generator 44c at input terminals 67 for Write Address Generator 65 to provide the audio write address, and to terminal 70 of the Read Address Generator in order 68 to provide the audio read address, which addresses are applied to the Audio Ram 43c. Clock generator 44c may be responsive to audio write address from write address generator 65 as will be described later.

Figure 6:
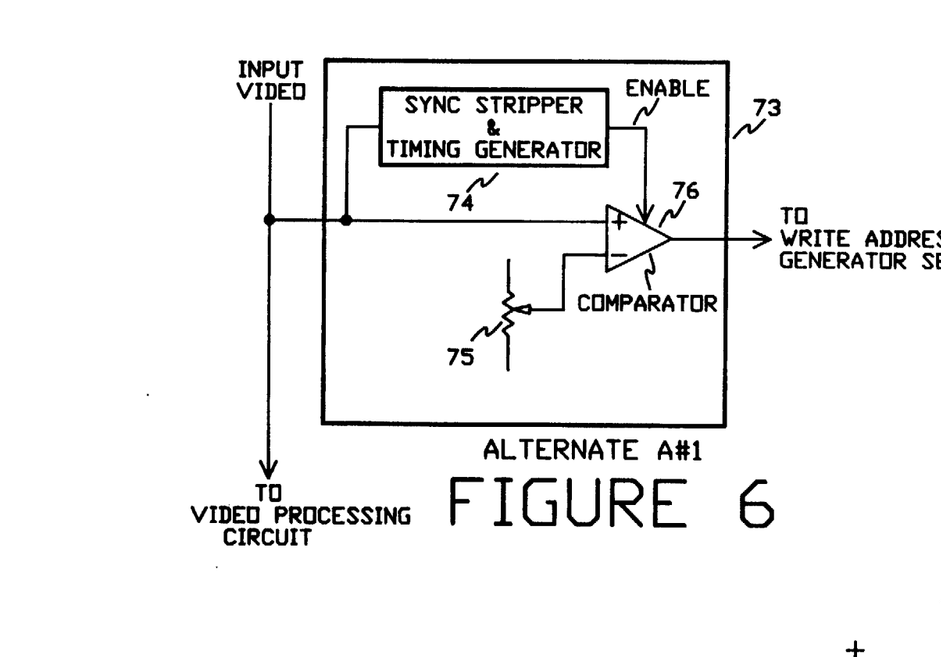
FIG. 6 shows an alternate version of block A of FIG. 5.

FIG. 6 shows an alternate embodiment of a Pulse Decoder 73 which may be substituted 53 of FIG. 5 for those applications where suitable sync pulses have been encoded onto the input video signal applied at 52 of FIG. 5. The Alternative Pulse Decoder 73 contains Sync Stripper and Timing Generator 74, a variable reference 75 and Comparator 76 operating the same as 62, 63, and 64 respectively of FIG. 5.

Figure 7:
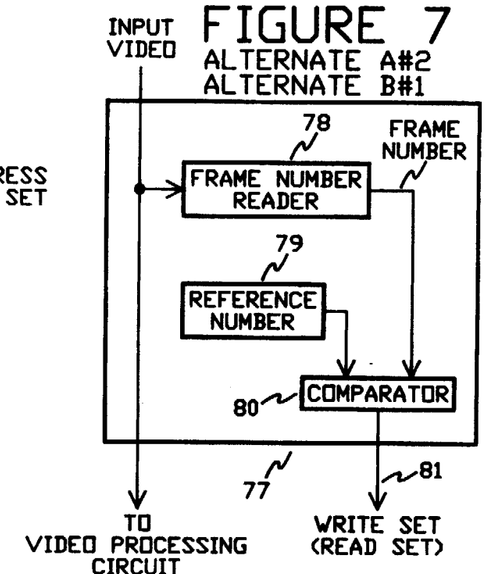
FIG. 7 shows an alternate version of blocks A and B of FIG. 5.

FIG. 7 shows an alternate embodiment 77 which may be used for 53 and 61 of FIG. 5 when input video applied at 52 is modulated with a time code signal. Included in 77 are Frame Number Reader 78 responsive to input video to decode the frame number of the present frame of input video, Reference Frame Number 79 which corresponds to a repetitive section of the frame numbers encoded in the time code of the input video, and Comparator 80 to detect when the present frame number from 78 contains a section corresponding to reference 79. When correspondence of present frame number to reference number occurs, the comparator outputs a write set signal (if used for 53) of a read set signal (if used for 61) at output 81.

Figure 8:
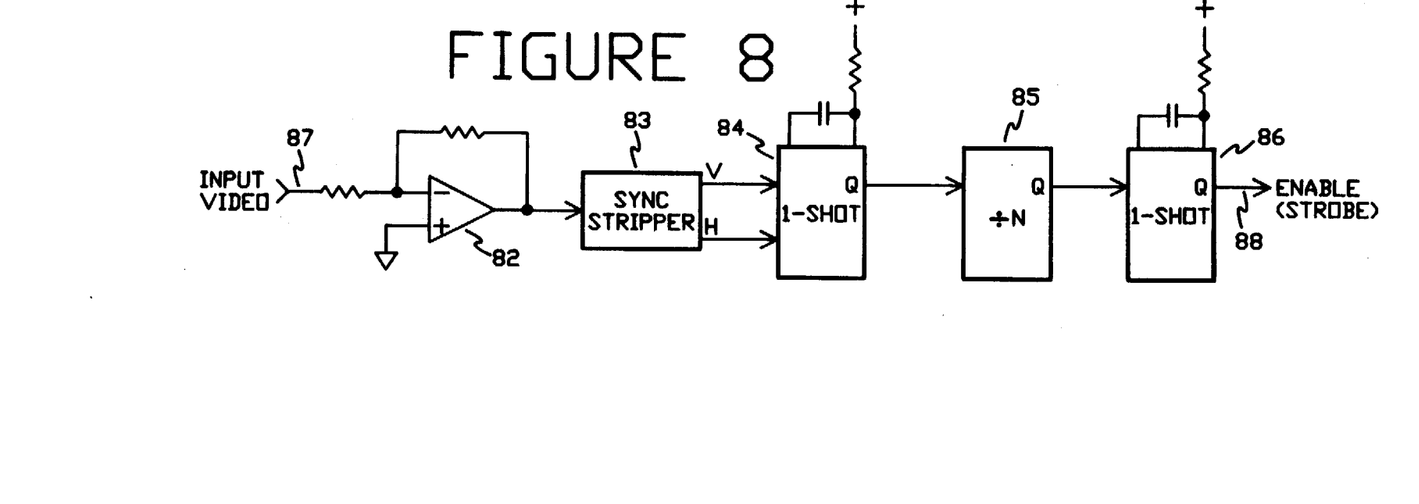
FIG. 8 shows an example of a sync stripper and timing generator circuit.

FIG. 8 is a more detailed diagram of the circuitry which is used in the sync stripper and timing generator 54 and 62, containing inverting amplifier 82, sync stripper 83, one shots 84 and 86 and counter 85 with input video terminal 87 and enable (or strobe) output terminal 88.

Referring first to FIG. 1, in most general terms, the synchronizer consists of a delay detector 3 which measures the relative delay between two incoming video signals at inputs 1 and 2, and provides a delay control signal 4 for control of variable audio delay 5 thereby causing the audio to be delayed with respect to the original video and audio signal in precisely the same amount as is the delayed video.

The delay detector 3 of FIG. 1 operated to determine the relative delay of a delayed video signal (or delayed frame sync) 2 with respect to input video (or input frame sync) 1 and thus the video delay of a video signal through a video system. Of course, if composite video is used, vertical, frame or field sync must first be stripped off and converted to levels usable by the variable delay 10 and phase comparator 12. Sync strippers of many varieties are well known in the art, one of which is shown as 83 of FIG. 8 which will be discussed later. Although other means may be employed, in the preferred embodiment, delay detector 3 measures the delay of input 2 by means of a phase-lock loop technique whereby the input video (or frame sync) signal is delayed by variable delay 10 in a precise amount to cause the phase comparator 12 to have in-phase signals at its input. This circuit is a conventional phase-lock loop which is similar to block 6 disclosed in U.S. Pat. No. 4,313,135. A commercially available integrated circuit which approximates the desired delay function 10 is the MM5057 manufactured by National Semiconductor. A commercially available integrated circuit which approximates the phase comparison function 12 is the MC4044 manufactured by Motorola. The memory delay control 13 can be the same as 19 of U.S. Pat. No. 4,313,135 or alternately can be a Texas Instruments 74LS629 dual VCO.

In some video systems, a specific, real-time timing signal is present periodically. In those cases, the timing signals from input and output video may be decoded and compared to give directly the value of the delay between the original video and the delayed video. This value may then be used to introduce the equivalent amount delay into the audio signal path. If this method is used, the video delay detector 3 may be understood to be replaced with an equivalent functional circuit which comprises a video timing signal decoder for each input and a delay control output signal 4 which is used to control the variable audio delay 5. This embodiment will be discussed in more detail with respect to FIGS. 2–8.

Use of timing signals at inputs 1 and 2 in FIG. 1 instead of the full video signals reduces the complexity of internal circuitry and improves the performance of the delay detector 3. The timing signal may be input to said delay detector 3 while still present on the video or may have been previously removed from the video signal by external circuitry such as that of FIGS. 5, 6, and 7 which is discussed later. A practical example of such a signal is the time code information, already in use by many video users and networks, which is located in the Vertical Interval Test Signal area of the video signal. This timing signal is especially valuable in measuring delays greater than one frame or in identifying a given frame so that it may be tracked through the video system and the delay thereof measured. As another embodiment of the invention, the timing signal can be derived from the video circuitry itself, for example the read and write address of a video frame synchronizer.

There are many commercially available circuits for decoding timing signals from a composite video signal including, for example the CD3226E manufactured by RCA. One skilled in the art will easily be ale to adapt such a circuit for use in a delay detector 3.

In either of its forms, delay detector 3 outputs a delay signal 4 which forces the variable audio delay 5 to match the variable delay 10 in delay time, thus causing input audio 6 to be delayed by an amount equal to the delayed video 2.

For the purpose of this disclosure, audio signals are any of the audio frequency signals which are associated with a video signal, including stereo audio and control signals. One skilled in the art will immediately recognize many applications in which it is useful to have one or more additional audio delay circuits 8 which are also responsive to the delay signal 4 in order to delay multiple audio signals such as stereo channels, multilingual channels, time codes and the like, or to have an operator adjustable fixed delay which may be used for reverberation effects or other special purposes.

It will also be obvious to one skilled in the art that any of several technologies could be used for the variable audio delay. Of the technologies currently available, charge-coupled device (CCD) type analog shift registers such as the SAD 512 manufactured by Reticon, are most cost effective. Full digital delay systems with analog to digital conversion, digital shift registers or RAM memory, and digital to analog conversion such as the Lexicon PCM 41, will provide the highest quality performance in terms of frequency response and distortion but at the expense of increased cost. The clocking signal or delay control for the shift register systems could be provided directly from memory delay control 13 which is, in the preferred embodiment, a voltage-controlled oscillator (V.C.O.) such as the Texas Instruments 74LS624. This is a very useful system since the variable frequency clocking signal provides positive, precise and simple control of any number of audio delay channels at a low cost. It normally requires but a single cable between delay detector and audio delays, with a minimum of circuitry at the audio delay a considerable advantage in certain installations. In a RAM memory type system, the delay length may be adjusted by changing the memory size or distance between write and read addresses while utilizing a fixed clock as will be described later.

In U.S. Pat. No. 4,313,135 a correlation device is described for use in detecting when the external video processing device has entered a "hysteresis" mode of operation, which mode corresponds to operation with a delay between original input and delayed input of slightly more than one frame. In many conventional video devices, the hysteresis mode will always be entered when input video overtakes delayed video by exactly one frame (or 1 field for a field delay device) and will remain in the hysteresis mode until an exact delay has been generated, which exact delay is constant with a given device.

In its most general terms, a full correlator is capable of detecting and then correcting for any number of frames of delay, by adding sufficient artificial delay to the audio signal to cause the delayed video and audio to be restored to synchronism. In the general case, this may entail the addition of multiple discreet frames of delay as well as some fractional part of a frame's delay.

When the maximum delay possible has been achieved which would have to be programmed into the audio synchronizer by an operator having knowledge of the video system, the audio synchronizer would then jump back to minimum delay, as would the video system. Of course, it is possible for the video system to have pointer crossings in both directions, corresponding to video written into the processing system either faster or slower than is read out, and therefore the pointer crossing detector would need to indicate which was the case.

For the situation where the video is written (input) faster than it is read, pointer crossing will indicate a change from maximum to minimum delay. When video is written slower than it is read, pointer crossing will indicate a change from minimum to maximum delay. When the change is from maximum to minimum, the video device will stay near maximum delay after the pointer crossing until the respective video sync signals have passed by some prescribed amount, (which the operator loads into the audio synchronizer) normally a few horizontal lines, when it then jumps from a large delay to a minimum delay. The net effect for the video system is to throw away a frame of video. When the change is from minimum to maximum, the video device will jump from a small delay to a large delay a few horizontal lines before the video vertical sync signals pass. The net effect is to repeat a frame of video.

The Motorola MC 4044 phase/frequency detector I.C. is well suited to detecting whether the write video is faster or slower than the read video by simply detecting the frequency of the input video sync pulses with respect to the output video sync pulses. Pointer crossing then requires that the vertical sync signals (or frame sync or field I sync) be tested for coincidence within the few horizontal lines of hysteresis for that particular video system, which has been loaded by an operator.

A pointer crossing detector 11 may be easily constructed utilizing the previously mentioned Motorola MC 4044, conventional counters and "D"-type flip-flops responsive to a coincidence detector such as the 74LS684 made by Texas Instruments and is much cheaper to implement than a full correlator circuit.

Alternatives to pointer crossing detectors include measurement of video output delay through the system using the video itself to carry a timing signal, or an external timing signal which is passed along the same delay path as the video signal, such as the time code signal which was previously described. Each of these could be used to establish the delay.

The pointer crossing detector 11 output may be input either to a variable length delay as is shown in the U.S. Pat. No. 4,313,135 or to the memory delay control 13 as shown in FIG. 3.

The memory delay control as shown in the preferred embodiment of FIG. 1 consist of an oscillator circuit that is switched from a voltage controlled oscillator during normal operation to one of two fixed frequency oscillators during the time the pointer crossing detector 11 indicates that the video system is operating in a hysteresis mode. The fixed frequency oscillators cause the audio delay to match either the minimum or maximum delay time of the video system as indicated by the pointer crossing detector. Of course, a fixed control voltage could also be applied to the V.C.O. in place of the control voltage derived from the phase comparator in order to attain the proper frequency. The audio delay during this mode of operation only approximates the video delay, however in practice it is still substantially closer than with no correction at all.

In overall operation, the pointer crossing detector 11 performs the function of sensing when input video frame sync catches up with delayed video frame sync, which corresponds to delayed video being delayed by one frame, and forces the audio delay to stay at a one frame delay, rather than jumping back to zero delay, until input video frame sync has passed delayed video frame sync by a predetermined amount, thus forcing the audio delay to closely match the video delay while the external video device is in the hysteresis mode of operation.

In many instances where video equipment is designed to operate on a full television signal, it will be wise to incorporate the audio synchronizer circuit herein described into the video processing device. In such a configuration, the video processing device, such as a frame synchronizer or digital effects unit, will frequently have the major portion of a delay detector as part of its own memory control circuitry thereby making it possible for the audio delay to be driven from this circuitry through a suitable interface. The interface will vary in complexity depending on the nature of the delay signal output from the delay detector circuit of the external video device, but typically would need to be only a phase detector and a voltage controlled oscillator. A typical connection to the audio synchronizer is shown in FIG. 1 where the alternate delay input 14 from an external video processing device is input through the optional interface 9. More detailed alternate embodiments are shown in FIGS. 3 and 4 which will be discussed later.

FIG. 2 shows an audio synchronizer which has additional filtering added to the variable audio delay 20 in order to compensate for undesirable side effects caused by using a sampling technique to produce the desired delay. These side effects can be especially troublesome when the sampling frequency is varied as in the preferred embodiment.

The present invention is described in terms of a sampled audio delay system, which is the preferred embodiment. The elements of such a system are described more completely in U.S. Pat. No. 4,313,135. In general, however, the incoming audio signal is sampled at periodic points on the waveform. As is well known, the sampling rate must be at least twice the highest incoming frequency according to the Nyquist sampling theorem. In one embodiment, each sample is then fed to the input of a serial shift register and is passed through the register at a rate which corresponds to the clock frequency of the register. At the end of the register, the output is sampled and held, thereby reconstructing the sample of the input, delayed by passage through the register.

In general, it is desired to reduce the amplitude of both incoming and outgoing high frequencies to the point at which, in the first instance, they do not interfere with the sampling process and, in the second instance, they do not allow spurious signals to appear in the output.

In general, it is necessary to filter the input and output of the sampling system to limit the frequency response of the signal passed through the system to the Nyquist rate or ½ the frequency of the sample rate.

Optimal filters for this requirement have a flat passband up to the highest desired frequency response and then a sharp low pass cut-off characteristic above that frequency.

Due to the practical nature of filters, however, it is difficult to build analog L-R-C filters which have both flat passband response and sharp low-pass cutoff characteristics. In most television audio systems flat passband response in the order of ±0.1 db is a most important attribute and, as a result, the design of input and output low-pass filters for the audio delay is such that they will have a poor cutoff characteristic. In turn, as a result of the poor cutoff characteristic, the minimum sample frequency must be significantly higher, typically 2 times higher, than the theoretical minimum sample frequency. The higher minimum sample frequency, which corresponds to that which is used at maximum audio delay, will add to the cost of the clocked audio delay 23, as well as degrading noise and distortion performance where CCD's are used in 23. One skilled in the art can see that if a better Nyquist low pass filter can be built when the cost and performance characteristics of the clocked delay 23 can be improved. A notch filter could also be used in order to remove unwanted frequencies such as 60 Hz hum. Discrete time or finite impulse response ("F.I.R.") filters have exactly the characteristics needed for this application. A typical F.I.R. filter can have a 0.01 db passband ripple, zero phase distortion and 100 db per octave rolloff at the cutoff frequency. F.I.R. filters are available on an integrated circuit using CCD technology with similar specifications where the cutoff, or corner frequency of such a F.I.R. filter would typically be 0.01×the clock frequency driving the filter. Commercial devices capable of this performance include the R5609 manufactured by Reticon.

FIG. 2 shows a variable audio delay 20 which utilizes F.I.R. filters 22 and 24 as Nyquist low pass filters on the input to and the signal output from the clocked delay 23 by way of 24. Because the corner frequency of 22 and 24 is 0.01 times the clock frequency it is possible to lock the cutoff frequency of these filters to the clock used for the clocked delay 23 by use of a simple digital divider 19. A typical value for this divider is 40 to 1 so that the cutoff of the F.I.R. filter would be 0.4×the clock frequency of clocked delay 23, thus tracking the Nyquist requirement of 23. If it is not desirable to have the cutoff frequency of the system track the delay time, a separate fixed frequency oscillator could be used to drive filters 22 and 24, provided only that the cutoff frequency meets the Nyquist requirements for 23 for all delay conditions. Since filters 22 and 24 are sampled filters, they too require bandwidth limiting of their respective input and output signals as is shown by filters 21 and 25. Because the clock frequency of these filters is so much higher than the signal frequency to be passed, the filter design will be very simple, and, in fact, in some systems these filters will be unnecessary due to the filtering effects of associated circuits or external equipment. The last part of the audio delay is equalizer 26. Since the clock rate of delay 23 at a maximum delay is now only slightly over 2 times the highest audio frequency, the SIN X/X frequency rolloff characteristic of the sampling system becomes a problem and must be equalized. As with the low-pass filters, it is possible to control the equalizer response with the output V.C.O. 18 so that it tracks the characteristics of the delay 23, thus providing proper equalization. An example of a commercially available integrated circuit suitable for such an equalizer is the Reticon TAD-12.

FIG. 3 shows an alternate embodiment of the audio synchronizer when used as part of an audio and video system. The left side of FIG. 3 shows a block diagram of a typical video synchronizer which utilizes random access memories as the storage elements. The video synchronizer operates to digitize video input at 27a with an A-D converter 29a, and to write the digitized video into the RAM memory 31a in response to write address locations generated by write address generator 30a. The write address is synchronized to the write clock from the write clock generator 28a which is synchronized to the input video. Therefore, the write address is synchronized to the input video. The A-D converter 29a is also synchronized to the video via the write clock 28a.

The portion of FIG. 3. to the left of the vertical dotted line illustrates a delay detector and video synchronizer. The dotted enclosure 301 is a delay detector equivalent in function to the delay detector 3 shown in FIG. 1. Dotted line enclosure 5 is a variable audio delay, equivalent to that shown in FIG. 1.

Digitized video is read out of the RAM memory 31a in response to read addresses from a read address generator 33a in synchronism with an external reference shown here as a reference clock generator 34a. The digitized video is converted back to analog by a D-A converter 32a and output via output terminal 35a.

Essentially, a video frame is first stored in the memory 31a, sample by sample, as it arrives at the input and then at some time later, as determined by the reference clock generator 39a, the samples of the video frame are taken out of the memory 31a. The process takes place continuously, with no common reference for the writing and reading so that the storage time or video delay will be constantly changing. The details of the above operation of a video frame synchronizer will be well known to one skilled in the art and therefore not discussed further. In order to obtain a measure of the video delay one may simply determine the difference of the write (input) address at any instant and the read (output) address. This is done by 36 in order to effect a low cost accurate delay detector. 36 does not need to send this difference to difference conditioner 38 continuously, and may function to send the difference only when it changes or at some repetitive rate, for example a few time second. This is partially because the video delay normally does not change that quickly. By way of example of this concept, assume a new video frame is written into memory 31a, sample by sample, starting at address 00 with new samples and thereafter a new address being generated every 100 nanoseconds (ns). After 50 samples, the reading of the frame starts at 00. The time that the sample stored at 00 has been stored is 50×100 ns or the difference between the write address (50) and the read address (00) multiplied by the period of the samples. In actual hardware, the arithmetic is somewhat more involved due to such factors as multiplexing of samples for parallel storage into the RAM, however one skilled in the art will encounter little difficulty in constructing a properly operating difference circuit in accordance with the present disclosure.

The measure of the delay from difference circuit 36 is conditioned by difference conditioner 38 which for this example will consist of dividing the difference by a fixed binary number. The output of the difference conditioner 38 is then added to the audio write address of the audio RAM by summing means 39 to generate the audio read address. The audio RAM 43a, A-D converter 45a, write address generator 41 and sample clock generator 44a operate to periodically and continuously convert samples of the audio signal input on terminal 46a to digital samples and to store them at locations in the RAM in response to the audio write address output from 41. The digital samples are later read from the audio RAM 43a in response to the audio read address from 39, and then passed to the D-A converter 47a where they are converted back to analog and output on terminal 48a in a delayed fashion.

It can be seen that if a number is added to the audio write address to generate the audio read address that that number will affect the delay time between writing and reading a particular audio sample. The aforementioned conversions, address generations and storage being continuous, it may be seen that the digitized audio is effectively delayed as it passes through the RAM 43a. The delayed digitized audio is then converted back to analog by the D-A converter 47a and output through terminal 48a. It can be seen that the number output from 38 changes the delay of the audio accordingly. Since the output of 36 is a measure of the video delay, the audio delay is therefore responsive to the video delay. The operation of the difference conditioner 38 for given sizes of video ram, audio RAM and corresponding clocking frequencies is defined such that the audio delay matches the video delay. For example, the operation of 38 is such that when difference on 37 corresponds to the maximum possible value, corresponding to the instance where one video RAM address is at zero and the other at the maximum allowable, for example 4096, then the output of 38 should correspond to the maximum allowable audio RAM address, for example 1024. Difference conditioner 38 then would divide the difference 37 by 4. Of course, it is possible to do this division on the individual video read and write address before the difference is computed, thus eliminating the need for 38. Such would be done by placing dividers in the address lines input to 36. The audio RAM 43a and sample clock generator 44a are configured in size and frequency such that the maximum audio delay is at least as large as the maximum video delay. As an added improvement, extra audio RAM delay 43a can be added and used to generate a fixed offset + or − to the adjustable delay by adding or subtracting a fixed offset number 40 in 39 when generating the audio read address.

The particular embodiment of FIG. 3 has an advantage in that the audio portion and the video portion are coupled by a single control line 37 or alternately 42. Only a relatively small amount of data need be transmitted over 37 or 42 since the difference need only be transmitted when changed, and held in either the difference conditioner 38 or summing means 39. The rate of change of the video delay is generally such that the difference may be updated only a few times a second and still provide excellent audio delay performance.

FIG. 4 is similar to FIG. 3 except that the audio read and write addresses are generated directly from the video read and write addresses respectively. In addition, the sample clock for the A-D converter 45b is now a fractional frequency of the write clock and is taken directly from the video write clock generator 28b thus eliminating the need for a separate audio clock generator. This embodiment utilizes a write address conditioner 49 and a read address conditioner 50 identical in operation except that they operate on the aforementioned different video addresses. The function of the address conditioners 49 and 50 is to operate on the video address to convert it to the proper size to fit the audio RAM memory 43b. Address conditioners 49 and 50 normally operate so that the video RAM address is divided by a fixed number in order to generate the proper audio RAM address. This number is simply the ratio between the maximum allowed video RAM address and the maximum allowed audio RAM address. If the maximum video RAM address is 4098 and the maximum audio RAM address is 1024, the conditioners 49 and 50 would divide the respective addresses by 4. Of course, if the maximum video RAM address were to be smaller than the maximum audio RAM address, the conditioners 49 and 50, as well as 38 of FIG. 3, would need to multiply by an appropriate number. Dividing by a binary power such as 4 is, of course, a trivial matter and would not actually require any hardware to perform on a binary number. It could be said that in that case the conditioners 38, 49, and 50 would not be needed. If a division (multiplication) by other than a binary power is needed it can be done simply with a programmable memory (PROM) or other circuits well known in the art.

It should be noted that the embodiment of FIG. 4 is simpler and therefore lower in cost than that of FIG. 3 but is not well suited to applications where the audio and video sections need to be separated by any distance or coupled by cables and the like. The interconnections between the audio and video synchronizer sections in the embodiment of FIG. 4 are an audio sample clock transmitted over coupling 51, and both read and write addresses from either before or after the conditioners 49 and 50. All of these signals are much higher frequency than that transmitted over 37 of FIG. 3. In FIG. 4 the audio RAM must have continuous addressing applied in order that the audio be continuous, thus requiring that continuous read and write addresses be constantly coupled to the audio section. The audio sample clock as well should be continuous.

In FIG. 3 the difference which is coupled over 37 or 42 need only be sent a few times a second, or less if the difference does not change for a few seconds. The low frequency nature of this signal, the only one which needs to be coupled from video to audio sections, makes it well suited for coupling over large distances, and for building simple interfaces between the video and audio synchronizers. The simplicity and low cost of this particular delay detector is one of the novel features of the particular embodiment shown in FIG. 3.

It should be noted that in a great many video synchronizers and other processing circuits, the memory addresses stop during the blanking interval. This, of course, would cause the embodiment of FIG. 4 to not perform properly since the audio would stop as well. It is necessary that the addresses input into the audio RAM memory from the video device be uninterrupted. The embodiment of FIG. 3 does not suffer from this problem since the audio addresses are always generated independent of the video addressing stopping.

In some instances it is desirable to not have to rely on the inner workings of a video system in order to accurately measure the delay of the video signals passing through them. The embodiment of FIG. 5 operates to insert an audio timing pulse onto the video signal before it passes through the system, and to detect when the video containing the audio timing pulse arrives at the output of the system. If the video already contains a suitable timing signal, for example SMPTE timecode, VITS, or DAXI frame numbers, this information can be used in place of the audio timing pulse to detect the delay through the video system.

Write signal generator 89 includes pulse encoder A, 53, and write address generator 65. Read signal generator 90 includes pulse decoder B, 61 and read address generator 68.

FIG. 5 contains a pulse encoder A 53 containing a sync stripper and timing generator 54, shown in more detail in FIG. 8, a pulse generator 55 and a combiner circuit 56. The sync stripper 54 decodes horizontal and vertical sync from the video input at 52 as well as the even field vertical sync "V-sync" of input video applied at terminal 52. A timer is started by even field V-sync to locate a line of the vertical interval suitable for adding the audio timing pulse. The timer also counts even field V's in order that the pulses are not added to every even field V but rather to every Nth even field V such that N times the frame period of the video exceeds the maximum delay that the video signal can experience in passing through the video system. This guarantees that there can be no ambiguity in measuring the video delay since only one pulse at a time is being measured through the system.

The detailed drawing of FIG. 8 shows the sync stripper of 54 as an inverting amplifier 82 responsive to input video from terminal 87 corresponding to 52 of FIG. 5, and a sync stripper such as a National Semiconductor TBA 950, 83, to separate H and V sync from the video, a 74LS423 oneshot to generate a pulse of known width in response to the even field V sync pulse, a 74LS393 to count a number of even field vertical sync pulses and pass one of said known width pulses' edges to a second 74LS423 oneshot to generate a second known width pulse which is output on terminal 88. The second known width pulse corresponds to the previously mentioned audio timing pulse in time and is referred to as an enable pulse or strobe. The strobe is applied to the write address generator 65 of FIG. 5 at set terminal 66 causing the write address generator to set to a known address. The strobe is also applied to a pulse generator 55 which in the preferred form consists of a resistive divider which outputs an audio timing pulse of proper amplitude which is combined with the video from 52. Of course, if the pulse output from 54 is already of proper amplitude, 55 can be eliminated. The video containing the pulse is then applied to the video processing circuit 58 at terminal 57. A diagram of the strobe pulse timing is shown by 72 with respect to the video at 57 shown by 71. Video output from the video processing circuit at 59 is applied to a pulse decoder B, 61, at terminal 60. A sync stripper and timing generator 62, the same as 54 shown in FIG. 8 except without counter 85, outputs an enable signal to comparator 64 on every even field where the pulse is expected in response to the video input at 60. The comparator 64 in conjunction with the reference 63 operates to detect when the input video level exceeds the reference, when enabled, as is well known in the art. The reference 63 is normally responsive to the video to be a value which is approximately ½ the amplitude level of the added pulse, with respect to the blanking level. Since the comparator is only enabled during the blanking interval line, where the pulse may be encoded, there will be no false triggering of the comparator by video. When the video frame containing the encoded pulse is output from the video processing circuit 58, the comparator detects the presence of the pulse and applies a signal to the set input 69 of the read address generator 68. The read address generator is then set to the same known address as the write address generator was set to earlier. The read audio will then read from the same address when the pulse is detected output from the video processing circuit as the address the audio was written into when the pulse was encoded on the video input to the video system.

In this fashion the audio will be stored by the same amount of time as the video. Since both the read address generator and the write address generator are clocked from the same source, namely clock generator 44c, the audio delay will remain the same until another pulse cycle is completed. The audio system is, of course, a continuous system except during the setting of 65 and 68 as previously described. As an alternate embodiment, clock generator 44c and write address generator 65 may be phase locked to sync from 54 instead of setting address generator 65 via 66a. Phase locking will ensure that the write address will be known address at the occurrence of the audio timing pulse, and will eliminate any glitching of the audio due to setting the write address generator, as could occur with the use of the set input. A phase lock loop i.e. such as the Signetics NE 564 can be used for clock generator 44c in order to implement a phase locked address generator. For phase locked operation the dashed connections to 44c would be made and 66a eliminated.

For another alternate embodiment of the circuit of FIG. 5, one may assume that a timing signal, pulse or pulse-like Vertical Interval Test Signal (VITS) may already be encoded on the video signal at a suitable location and period. This being the case, it is unnecessary to encode another timing signal in the video, but is only necessary to detect the presence of the signal pulse as it arrives, encoded on the video, at the input terminal 52. The pulse encoder A, 53, then would function the same as pulse decoder B, 61. Pulse encoder A, 53, would then detect the presence of the encode pulse at the expected location on input video input 52 and output a signal to the set input 66 of the write address generator 65 to set said generator as previously described.

If the video input into the comparators of 53 or 61 is clamped or otherwise referenced to a pre-established d.c. voltage, the responsive reference 63 is unnecessary, and may be replaced with a fixed reference 75 as shown in FIG. 6, an alternate embodiment of 53 and 61. FIG. 6 contains a comparator 76 such as an LM311 type, the preferred I.C. for this function. The sync generator and timing generator 74 will be the same as FIG. 8 when replacing 53 of FIG. 8 less 85 when replacing FIG. 6. The fixed reference 75 may be simply a variable resistor connected to two voltage potentials as is commonly known.

Another embodiment of detector for use with timing signals which are encoded on the video is shown FIG. 7. Timing signals such as SMPTE timecode and DAXI code are often encoded in the vertical blanking area of video signals. Generally these codes are such that they contain an individual frame number for each frame of video. The frame numbers are almost always numbered sequentially with some arbitrary starting number at the beginning of a particular program segment. In some instances, such as in some SMPTE timecode systems a frame number is periodically dropped in order to make the frame numbers correspond to normal clock time since television frames occur slightly less than 30 times per second. In any event, it may be assumed that a majority of frames of the incoming video contain sequential numbers. It is possible to detect a few least significant bits of the frame numbers which are never dropped, for example those frames which have numbers ending in 00 (assuming a base 10 numbering system) and use the occurrence of that frame as a replacement of the pulse of the embodiment of FIG. 5 replacing the shown pulse encoder 53 and decoder 61. Such a system is shown in FIG. 7. The frame number reader 78 removes the time code (or frame number) from the incoming video and applies the least significant bits of interest of the frame number to a comparator 80. The reader can be built on an I.C. such as an RCA CD3226E DAXI buffer.

The comparator 80 is responsive to said bits and a reference number 79 (in this example 00) to detect when the aforementioned bits match the reference number. Of course, reference number 79 and comparator 80 blocks could simply be constructed of an OR gate to detect all zero's in those LSB's of a binary or BCD number. The detection of said match causes a signal to be output from the comparator 80 via output terminal 81 to the set input of the appropriate address generator 65 or 68. The circuitry of FIG. 7 would then replace that of each of 53 and 61. The particular embodiment of FIG. 5 where 53 and 61 are replaced by the circuitry of FIG. 7 is well suited to audio synchronizers which are to be added to an existing video system since it requires no modifications to the video signal or to the video system.

It is, of course, obvious from the teachings of this disclosure to combine different parts of the disclosed embodiments in various ways to construct other embodiments of the invention which may have a particular feature which suits a particular need. By way of example, the elements 53 and 61 of FIG. 5 can be used to provide inputs 1 and 2 respectively to the delay detector 3 of FIG. 1. The pointer crossing detector 11 and associated parts in the memory delay control 13 can be eliminated since the pulse encoder 53 operates in a fashion which eliminates hysteresis ambiguity problems, thus always directly indicating the delay though the video circuit. The same substitution can also be made with respect to FIG. 2. The audio delay can then be constructed around a variable clock frequency type memory instead of a fixed clock type memory. The elements 53 and 61 can also be made responsive to the video read and write address generators of a video device such as that shown in FIGS. 3 and 4, instead of to a timing signal on the video signal. A time difference can be computed between the pulses normally applied to 66 and 69 of FIG. 5 and that difference used the same as the difference output from 36 of FIG. 3. The time difference is computed by clearing and starting a counter with the pulse normally applied at 66 and stopping the counter with the pulse normally applied at 69 of FIG. 5. The count after stopping is a measure of the video delay. The counter would be clocked with a source whose frequency preferable is related to the audio sample clock generator.

Several other combinations of parts of the preferred embodiment are possible and will be obvious to one skilled in the art from the teachings of the present disclosure.

It should be noted that each of the embodiments of the present invention contains two main sections, a delay detector to measure the delay of video passing through a video system, and an audio delay responsive to the video delay to delay the audio signal or signals by an amount roughly the same as the video delay. The delay detector embodiments can be grouped into two main categories, those which are responsive directly to the video signal or timing information encoded thereon, and those responsive directly to the inner workings of the video system. The audio delays can be grouped into two main sections, those utilizing fixed frequency clocks and RAM or variable size memory and requiring an adjustment of the read and write timing or memory size to adjust the audio delay, and those utilizing shift register or fixed length memory and requiring a selection or adjustment of clocking frequency to adjust the audio delay. Any of the delay detector embodiments can be suitably coupled to any of the audio delay embodiments to build an embodiment of the invention as herein disclosed.

Each embodiment of the delay detector has particular advantages and disadvantages. Those of FIGS. 3 through 5 work well and are easy to construct. They do not suffer from ambiguity problems caused when the video delay is longer than the repetition rate of the video signal sync signals. They are, however, upset if the video system removes or alters the timing signals utilized by the delay detector, in the embodiment of FIG. 5. The embodiment of FIGS. 3 and 4 have the disadvantage of requiring direct connection to the inner workings of the video system, but generally perform well at a low cost as previously discussed. The embodiment of FIG. 1 is low in cost, but when used with a video input can only approximate the proper audio delay when the video delay is greater than the repetition period of the signals input into the delay detector.

The audio delay embodiments also have their particular advantages and disadvantages. The fixed size memory types utilizing variable clocking give smooth and continuous delay length changes and are low in cost, but can suffer from filtering problems because of the changing sampling frequency. The changing memory size fixed clock delays do not have the filtering problems due to the fixed sampling frequency, but are expensive due to the increased complexity and also suffer from the fact that the changes in delay length must be made in discrete steps. This problem also exists for a shift register in which the register length is changed to change the delay, such as would be the situation in a digital differential pulse code system of fixed sample frequency such as is commonly utilized for audio delays in the radio industry. Whenever the delay length is shortened one or more samples of audio is lost giving rise to a discontinuity causing noise. When the delay length is increased extra samples of audio are added with the same effect. In either instance, annoying noise is added to the audio signal. Such noise can, however, be reduced by the apparatus disclosed in U.S. Pat. No. 4,313,135.

In any embodiment of the present invention, when the video system makes a large change in delay length, such as a frame synchronizer jumping from maximum to minimum delay at pointer crossing, it is wise to cause the audio delay to change in other than an instant fashion, either by causing the audio delay to wait until a period of silence before changing the delay, or making the delay change gradually over the period of several seconds. These procedures will help to eliminate "pops" of noise in the audio which will occur within instant change of delay length of a large amount. The above popping can be the cause of much futile searching for defective components since it happens infrequently and the cause is not generally obvious. The first solution is had by inspecting the audio samples and not making the delay change until the samples have remained relatively unchanged corresponding to quiet over a period of time corresponding to the length of the delay change. The second can be realized by limiting the slew rate of the control voltage of the V.C.O. of 18 of FIG. 2, as can simply be done by one skilled in the art with an RC filter.

In operation, the audio synchronizer will measure the video delay through a video processing system, and adjust one or more audio delays in response to the measured delay in order to delay the audio signals by an amount equal to the video delay. The systems operate in a continuous manner so that if the video delay is constantly changing due to video being input to and output from the video processing system at different rates, the audio delay will change in order to closely match the video delay. The audio delay circuit operation may be refined as is needed to provide maximally flat filtering and optimum high frequency response which may be automatically adjusted to compensate for changes in required filter parameters due to the changing sample rate of the audio delay device and to minimize noise introduced due to delay length changes.

Although this invention has been described in its preferred form with a certain degree of particularity, it is understood that the present disclosure of the preferred embodiment has been made only by way of example and that numerous changes in the details of construction and the combination and arrangement of parts may be resorted to as well as combination of functions within or as part of other devices, without departing from the spirit and scope of the invention as hereinafter claimed.

What is claimed is:

1. An apparatus for equilizing video to audio frequency signal timing in a television system of the type having a video signal processing path separate from the audio path, and having a video processing circuit having an input and an output, comprising:
    an audio write address circuit responsive to the timing of the video input to said video processing circuit for generating an audio write address signal;
    an audio read address circuit responsive to the timing of the video output from said video processing circuit for generating an audio read address signal;
    a digital audio memory responsive to said audio read address signal and to said audio write address signal and having an input and an output;
    an analog to digital converter having an input responsive to an analog audio signal and having an output compatible with and communicating with the input of the audio memory, and;
    a digital to analog converter responsive to the output of said digital audio memory for converting the output of said digital audio memory to analog signals.

2. An apparatus for equilizing video to audio frequency signal timing in a television system of the type having separate audio and video signal processing paths and having a video processing circuit having an input to which an input video signal is applied and an output at which an output video signal is produced, comprising:
    a pulse encoder responsive to preselected characteristics of said input video for generating a timing pulse having characteristics suitable for adding to said video signal, said timing pulse being representative of the occurrence of a preselected characteristic in a video frame, said pulse encoder including a video summer responsive to said input video and the output of said pulse encoder for adding said timing pulse to said input video, said video and pulse combination appearing at the output of said video processing circuit after a delay time;
    a pulse decoder responsive to the presence of the timing pulse at the output of the video processing circuit;
    audio read address generator responsive to the pulse decoder output signal for generating an audio read address signal;
    a digital audio memory responsive to said audio read address signal and to an audio write address signal and having an input and an output;
    an analog to digital converter having an input responsive to audio signals and having an output compatible with the input of said digital audio memory;
    a digital to analog converter responsive to the output of said digital audio memory for converting the output of said digital audio memory to analog signals.

3. The apparatus as claimed in claim 2 wherein said timing pulse is responsive to vertical sync of said input video.

4. The apparatus as claimed in claim 2 wherein said timing pulse is responsive to horizontal sync of said input video.

5. The device as claimed in claim 2 wherein said timing pulse is added to a known line of the vertical interval of said input video.

6. The apparatus as claimed in claim 2 wherein said timing pulse is added to every Nth field of said input video where N is an integer greater than 1.

7. The apparatus as claimed in claim 2 wherein said timing pulse is added to every Nth field of said input video where N is an integer and the value of N times the field period of said input video exceeds the maximum delay that said input video signal can experience in passing through said video processing circuit.

8. The apparatus as claimed in claim 2 wherein said pulse encoder is partially contained within other video processing equipment and encodes a timing signal on said input video signal with said timing signal being used as said timing pulse with said pulse encoder responsive to said input video signal to detect the presence of said timing signal as it arrives at said input of said video processing circuit.

9. The apparatus as claimed in claim 8 wherein said timing signal is a vertical interval test signal.

10. The apparatus as claimed in claim 8 wherein said timing signal is a time code.

11. The apparatus as claimed in claim 8 wherein said timing signal is a DAXI code.

12. The apparatus as claimed in claim 8 wherein said timing signal is a code having a unique pattern for each of multiple frames of said input video to said video processing circuit.

13. The apparatus as claimed in claim 2 wherein said pulse decoder is responsive to said video output signal from said video processing circuit to detect the presence of said timing pulse thereon.

14. The apparatus as claimed in claim 13 wherein said pulse decoder compares said input video and timing pulse combination output from said video processing circuit to a reference.

15. The apparatus as claimed in claim 14 wherein said reference is responsive to said input video and timing pulse combination output from said video processing circuit.

16. The apparatus as claimed in claim 13 wherein said pulse decoder is responsive to vertical sync of said input video and timing pulse combination output from said video processing circuit.

17. The apparatus as claimed in claim 13 wherein said pulse decoder is responsive to horizontal sync of said input video and timing pulse combination output from said video processing circuit.

18. The apparatus as claimed in claim 2, 3, 4, 5, 6, 7, 8, 9, 10, 11, 12, 13, 14, 15, 16 or 17, wherein said read address generator adjusts said audio read address signal in response to said pulse decoder response to the presence of said timing pulse.

19. The apparatus as claimed in claim 2 wherein said analog to digital convertor operates with a sample clock responsive to said input video.

20. The apparatus as claimed in claim 2 including an audio write address circuit comprising a video write address generator for generating a video write address in response to said input video and a write address conditioner for generating said audio write address signal in response to said video write address.

21. The apparatus as claimed in claim 20 including a write clock generator circuit responsive to said input video for generating a write clock, with said video write address generator responsive to said write clock and wherein said analog to digital convertor operates with a sample clock derived from said write clock.

22. The apparatus as claimed in claim 2 wherein said audio read address generator includes a video read address generator for generating a video read address, and a read address conditioner for generating said audio read address signal in response to said video read address.

23. An apparatus for equilizing video to audio frequency signal timing in television system of the type having a timing signal encoded onto the video signal, which timing signal is representative of elapsed time from a starting point in an original program until the time of a frame bearing said encoded timing signal, and having separate audio and video signal processing paths and having a video processing path at least part of which includes a delay, comprising:

- a plurality of timing signal decoders having inputs responsive to said timing signal encoded on said video signal in delayed and undelayed form and each having an output signal which is responsive to said timing signal
- an audio write address generator responsive to said output signal of said timing signal decoder and responsive to said undelayed video signal for generating a write address signal;
- an audio read address generator responsive to the output of the timing signal decoder and responsive to delayed video, for generating a read address signal;
- a digital random access memory responsive to read address signal and to said write address signals, and having an input and an output;
- an analog to digital converter having an input responsive to analog audio signals and having an output compatible with the input of the digital random access memory, and;
- a digital to analog converter responsive to the output of said digital random access memory for converting the digital signal of said digital random access memory to an analog signal.

24. The apparatus as claimed in claim 23 wherein said timing signal is a code having a unique pattern for each of multiple frames of said video input to said video processing circuit.

25. The apparatus of claim 23 wherein said encoded timing signal is a digital equivalent of the real time of day of said original program and wherein the timing signal decoder is responsive to the real time of day encoded timing signal.

26. The apparatus of claim 23 wherein said encoded timing signal is the SMPTE time code and wherein said timing signal decoder is responsive to the SMPTE time code.

27. The apparatus as claimed in claim 23, 24, 25 or 26, wherein said audio read address generator adjusts said audio read address signal in response to said timing signal pulse decoder responding to said timing pulse.

* * * * *